(12) United States Patent
Philipp et al.

(10) Patent No.: US 11,273,794 B2
(45) Date of Patent: Mar. 15, 2022

(54) OPTICAL SURFACE CONTAMINANT DETECTION

(71) Applicant: GM GLOBAL TECHNOLOGY OPERATIONS LLC, Detroit, MI (US)

(72) Inventors: Tzvi Philipp, Bet Shemesh (IL); Igai Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 16/515,679

(22) Filed: Jul. 18, 2019

(65) Prior Publication Data

US 2021/0016744 A1    Jan. 21, 2021

(51) Int. Cl.
| | | |
|---|---|---|
| *B08B 3/08* | (2006.01) |
| *B60S 1/08* | (2006.01) |
| *G02B 27/00* | (2006.01) |
| *G01N 21/94* | (2006.01) |
| *B08B 1/00* | (2006.01) |
| *B60S 1/54* | (2006.01) |
| *B60S 1/46* | (2006.01) |

(52) U.S. Cl.
CPC ............ *B60S 1/0833* (2013.01); *B08B 1/005* (2013.01); *B08B 3/08* (2013.01); *G01N 21/94* (2013.01); *G02B 27/0006* (2013.01); *B60S 1/46* (2013.01); *B60S 1/542* (2013.01); *G01N 2021/945* (2013.01)

(58) Field of Classification Search
CPC combination set(s) only.
See application file for complete search history.

(56) References Cited

U.S. PATENT DOCUMENTS

| H376 H | * | 12/1987 | Bremer | 356/124 |
| 5,808,734 A | | 9/1998 | Kolari | |
| 2016/0359453 A1 | * | 12/2016 | Jones | G01R 31/40 |
| 2017/0259788 A1 | * | 9/2017 | Villa-Real | B08B 3/02 |
| 2018/0331653 A1 | * | 11/2018 | Gostein | H02S 50/15 |

* cited by examiner

*Primary Examiner* — Erin F Bergner
(74) *Attorney, Agent, or Firm* — Quinn IP Law

(57) ABSTRACT

A vehicle and/or a method for detecting contaminants on an optical surface are provided. The vehicle includes at least one light source adjacent the optical surface and at least one light detector at an edge of the optical surface. A controller is configured to introduce light from at least one light source into the optical surface, and to measure light at the edge of the optical surface with at least one detector. The controller compares the measured light to a threshold, and, if the measured light crosses the threshold, triggers or implements a response action.

7 Claims, 4 Drawing Sheets

OPTICAL SURFACE CONTAMINANT DETECTION

The disclosure relates to detection of contaminants on windows or other optical surfaces, and, more particularly, to an automated system for detection of dirt, water, oil, or other contaminants on vehicle windows. Remediation may be triggered by the detection.

SUMMARY

A vehicle and a method for detecting contaminants on an optical surface, such as a window, are provided. The vehicle includes at least one light source adjacent the optical surface and at least one light detector at an edge of the optical surface. A controller is configured to introduce light from the at least one light source into the optical surface, and to measure light at the edge of the optical surface with the at least one detector.

The controller compares the measured light to a threshold, and, if the measured light crosses the threshold, triggers a response action or cleaning operation, which may remediate against the contaminants. In some configurations, the response action may be one or more of: cleaning the optical surface with a wiper blade; depositing a wiper fluid on the optical surface; triggering a defogger for the optical surface; and triggering or sending a maintenance signal.

In some configurations, the light source is positioned at the edge of the optical surface, and triggering the response action occurs when the measured light crosses below the threshold. Measuring light at the edge of the optical surface with the detector may include detecting an initial light value and a current light value, and determining a differential value between the initial light value and the current light value. The determined differential value may be compared to the threshold.

In some configurations, the detector may be a spectrophotometer. Light measured by the spectrophotometer may be analyzed, and the type of contaminant on the optical surface may be identified based on the analyzed light. Identifiable contaminants may include water, dirt, and oil. Determination of the type of contaminant may result in different remediation actions, such as operating the wiper blade if the contaminant is water; applying the wiper fluid if the contaminant is dirt; or applying a detergent if the contaminant is oil.

The light source may project a non-visible wavelength. Additionally, the light source may be positioned at an angle of incidence relative to the optical surface that is less than a critical angle between the optical surface and air, and triggering the response action may occur when the measured light crosses above the threshold.

The above features and advantages, and other features and advantages of the present disclosure, will be readily apparent from the following detailed description of the configuration(s), embodiment(s), and/or best mode(s) for carrying out the described disclosure when taken in connection with the accompanying drawings and appended claims.

DETAILED DESCRIPTION

Figure 1:
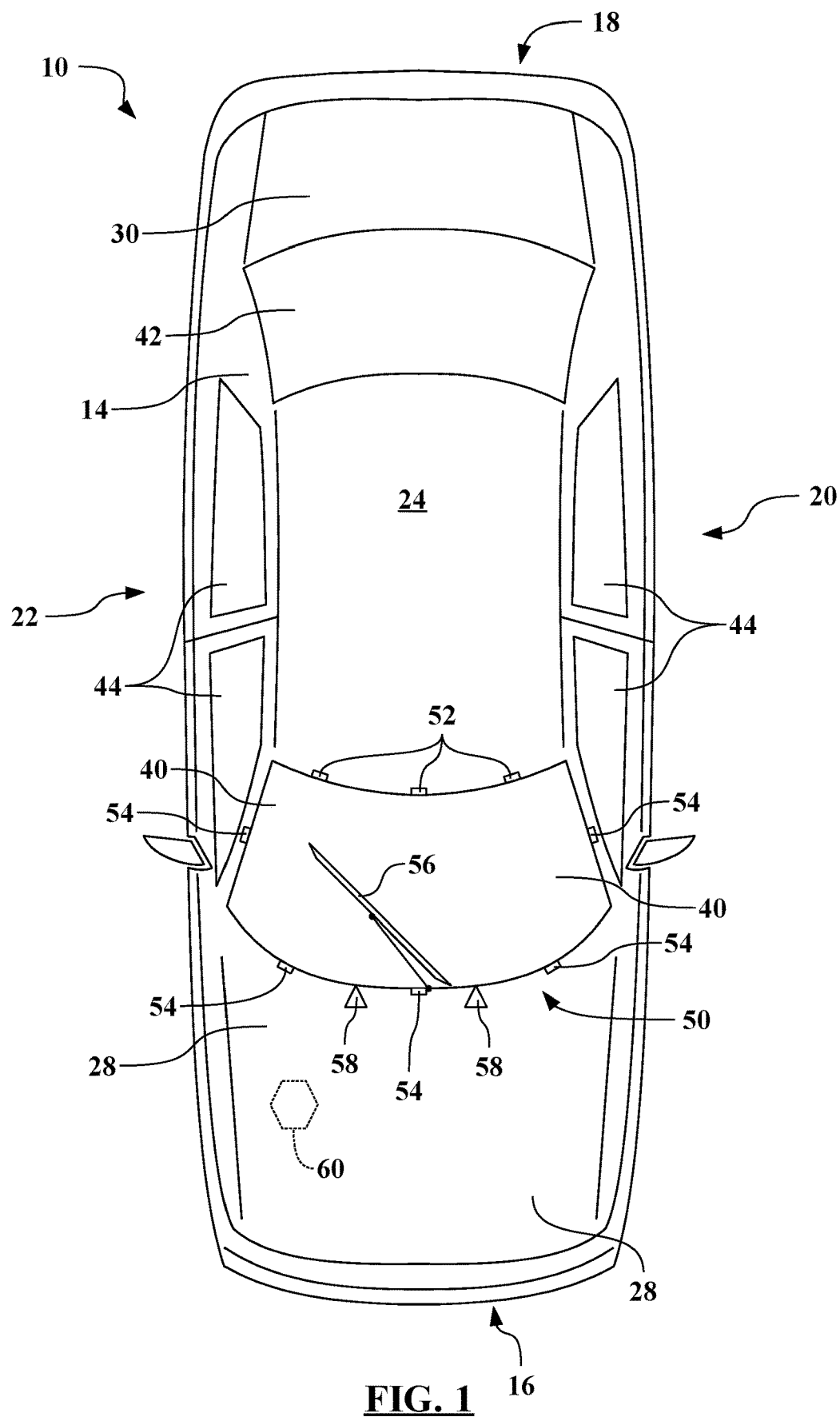
FIG. 1 is a schematic top view of a vehicle with a contaminant detection system for a window.

Referring to the drawings, wherein like reference numbers correspond to like or similar components throughout the several figures, a portion of an example vehicle 10 is shown schematically in FIG. 1. The vehicle 10 may be, but is not limited to, a commercial vehicle, industrial vehicle, passenger vehicle, aircraft, watercraft, train or any mobile platform. It is also contemplated that the vehicle 10 may be any mobile or rolling platform, such as an airplane, all-terrain vehicle (ATV), boat, personal movement apparatus, robot and the like to accomplish the purposes of this disclosure. For purposes of convenience and clarity, directional terms such as top, bottom, left, right, up, over, above, below, beneath, rear, and front, may be used with respect to the drawings or with respect to vehicle orientation. These and similar directional terms are not to be construed to limit scope. Number designations, such as first or second, are also not limiting and may be interchanged in light of the description.

While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

The vehicle 10 in FIG. 1 includes a vehicle body 14 having a first end or front end 16, an opposing second end or rear end 18, a first lateral portion or left side 20 generally extending between the front and rear ends 16, 18, and an opposing second lateral portion or right side 22. The vehicle body 14 further includes a top body portion or top surface 24, which may include at least a vehicle roof portion, and an opposing lower body portion or underbody. A passenger compartment (not viewable) is defined within the vehicle body 14. As understood by those skilled in the art, the first or front end 16 may face oncoming ambient airflow when the vehicle 10 is in motion relative to the road surface. Each of the left side, right side, and top body sections, 20, 22, and 24, respectively, spans between the front and rear ends 16, 18 of the vehicle body 14.

The vehicle 10 also includes a bonnet or hood panel 28 adjustably mounted to the vehicle body 14 and movable between at least one open position where the hood panel 28 is unfastened from the vehicle body 14 to provide access to an under-hood compartment and a closed position wherein the hood panel 28 extends at least partially above and across to cover the under-hood compartment. The hood panel 28 may be pivotally mounted to one or more load-bearing members of the body 14 to provide access to, and securely close, the top portion of the under-hood compartment. The vehicle 10 may also include a vehicle roof, generally at or along the top surface 24, and a trunk lid 30.

The vehicle 10 includes several glass elements or windows. A front windshield 40 is generally disposed between the hood panel 28 and the top surface 24 providing a generally forward view for the driver, passengers, or autonomous systems of the vehicle 10. A rear window 42 is generally disposed between the trunk lid 30 and the top surface 24, and a plurality of side windows 44 are disposed between the respective sides and the top surface 24. Note that the specific location or orientation of the glass elements of the vehicle 10—shown is not limiting. Furthermore, each of the illustrated glass elements may be formed from any material usable as for windows, particularly those installed in vehicles. For example, the front windshield 40 may be formed from, without limitation: common glass; laminated, treated, or multi-layer glass; polycarbonate, acrylic, or other plastics or composites.

A contaminant detection system 50 is disposed in proximity to the front windshield 40. Although illustrated with respect to the front windshield 40, the contaminant detection system 50 is also representative of detection systems that may be used with the rear window 42 or the side windows 44.

The term window is used broadly herein to refer to any optical surface or any component configured to allow light passage to and/or from the vehicle 10. For example, the term window may refer to plastic shields on the front end 16 or the rear end 18 that house and protect head lamps or componentry used for autonomous driving. Additionally, cameras or other componentry may be mounted on top of the vehicle and shielded from the elements by windows.

The vehicle 10 and the contaminant detection system 50 are configured to determine whether there are contaminants on a window, such as the front windshield 40. At least one light source 52 is mounted adjacent or proximate to the front windshield 40.

Additionally, at least one light detector 54 is mounted at an edge of the front windshield 40. Each light detector 54 is configured to measure light passing through the front windshield 40, particularly light experiencing total internal reflection (TIR).

In the configuration shown, both the light sources 52 and the detectors 54 are positioned substantially parallel to the edges of the front windshield 40. Therefore, the light sources 52 are configured to introduce light into the front windshield 40 that is generally subject to total internal reflection and the detectors 54 are configured to measure light propagating through the front windshield 40 via total internal reflection.

The contaminant detection system 50 also includes at least one wiper blade 56 that is configured to selectively move or wipe across the front windshield 40. Note that while only one wiper blade 56 is shown, there may be additional wiper blades 56 on the front windshield 40, and there may be one or more wiper blades 56 on the rear window 42 or any of the side windows 44.

A depositor 58 is configured to deposit cleaning fluid onto the front windshield 40. The cleaning fluid from the depositor 58, which may be, for example and without limitation: water, washer fluid or wiper fluid, cleaning fluid, detergent, or combinations thereof. The cleaning fluid may work in concert with the wiper blade 56.

A controller 60 is operatively in communication with all of the components of the contaminant detection system 50. The controller 60 is a non-generalized, electronic control device having a preprogrammed digital computer or processor, a memory or non-transitory computer readable medium used to store data such as control logic, instructions, lookup tables, etc., and a plurality of input/output peripherals or ports. The controller 60 is configured to execute the control logic or instructions described herein.

The controller 60 may have multiple processors or integrated circuits in communication, such as logic circuits for analyzing and managing data. In some examples, the controller 60 may be a plurality of controllers, each of which is designed to interface with and manage specific componentry within the vehicle 10, and each of the plurality of controllers is in electronic communication with the others. However, while in some examples more than one controller 60 may be used, for ease of understanding, the following description will focus on the contaminant detection system 50 having only one controller 60. The controller 60 may be dedicated to the contaminant detection system 50 or may be part of a larger control system that manages other functions of the vehicle 10.

As will be explained in more detail, the controller 60 is configured to manage the contaminant detection system 50 by introducing light from one or more of the light sources 52 into the front windshield 40, and measuring that light with one or more of the detectors 54. The controller 60 is also configured to compare the measured light to a threshold, and, if the measured light crosses the threshold, trigger a response action or cleaning operation. The response action may include, for example and without limitation, wiping or cleaning the front windshield 40 with the wiper blade 56, of instructing the depositors 58 to deposit wiper fluid onto the front windshield 40. Other remediation actions, such as other cleaning operations, including any methods or mechanisms for cleaning the optical surface, may be used by the contaminant detection system 50.

As light from the light sources 52 propagates through the front windshield 40, contaminants—including, without limitation, water or dirt—will change the refractive index from that between air and the material of the front windshield 40, such as glass or laminated glass. Therefore, the contaminants may cause some of the light propagating via total internal reflection to leave, or escape, the front windshield 40. The contaminants may, therefore, result in reduced light being measured by the detectors 54.

While the contaminant detection system 50 is illustrated with the light sources 52 positioned at the top edge of the front windshield 40, the may be light sources 52 located along the side or bottom edges. Furthermore, while the detectors 54 are illustrated on the side and bottom edges of the front windshield 40, they may be located only on some of the edges, and may also be located along the top edge with the light sources 52.

For example, and without limitation, the detectors 54 may be located at approximately 180 degrees from the light sources 52, as shown in FIG. 1, or may be located one the side edges of the front windshield 40, at approximately 90 and 270 degrees. In some configurations, the light sources 52 and the detectors 54 may be staggered or alternated along one or more common edges of the front windshield 40.

Figure 2:
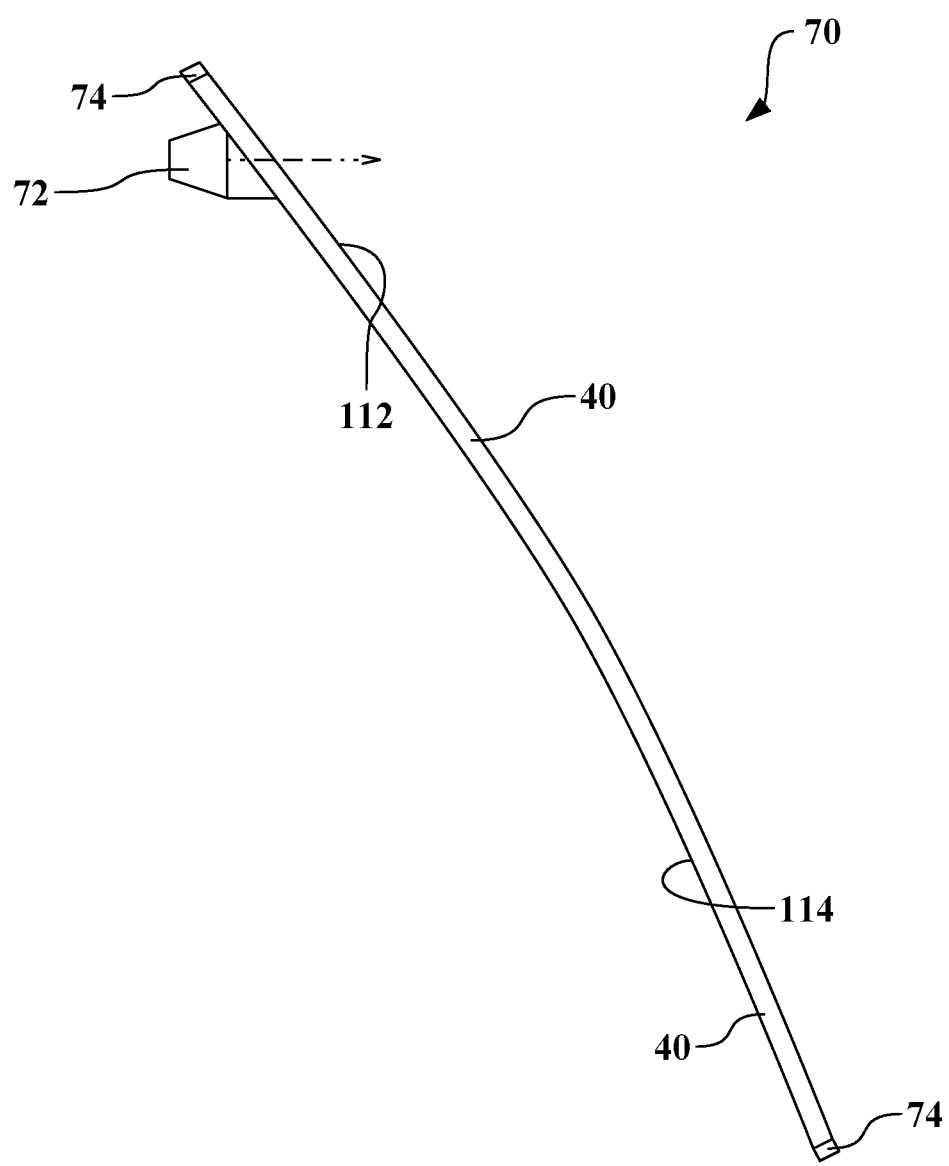
FIG. 2 is a schematic side view of a face-lit contaminant detection system for a window.

Referring to FIG. 2, and with continued reference to FIG. 1, another contaminant detection system 70 is disposed in proximity to the front windshield 40. Although illustrated with respect to the front windshield 40, the contaminant detection system 70 is also representative of detection systems that may be used with the rear window 42 or the side windows 44 illustrated in FIG. 1, or any other optical surface of the vehicle 10. Note, also, that FIG. 2 is highly schematic.

The contaminant detection system 70 is configured to determine whether there are contaminants on the front windshield 40. At least one light source 72 is mounted adjacent or proximate to the front windshield 40. Additionally, at least one light detector 74 is mounted at an edge of the front windshield 40. Each light detector 74 is configured to measure light passing through the front windshield 40, particularly light experiencing total internal reflection. A controller, such as the controller 60 shown in FIG. 1, may also be associated with the contaminant detection system 70.

However, in the configuration shown in FIG. 2, the light source 72 is not positioned substantially parallel to the edges of the front windshield 40. Contrarily, the light source 72 is oriented closer to perpendicular to the front windshield 40 than it is parallel.

Therefore, the light source 72 is configured to introduce light into the front windshield 40 that is generally not subject to total internal reflection, but instead passes through the front windshield 40, unless contaminants prevent such passage. The detectors 74 are still configured to measure light propagating through the front windshield 40 via total internal reflection.

In many configurations, the light source 72 projects light having a non-visible wavelength. For example, and without limitation, the light source 72 may be part of a light detection and ranging (LIDAR) system or a radio detection and ranging (RADAR) system. This light is used for other purposes, such as for determining the location of adjacent vehicles or objects for driver assistance or for autonomous control of the vehicle 10. There may be additional light sources 72 used for the same, or different functions by the vehicle 10.

The light source 72 is positioned at an angle of incidence, as schematically illustrated in FIG. 2, relative to the front windshield 40 that is lesser than a critical angle between a material of the window and air. The critical angle is offset from normal to the incident surface (i.e., 90 degrees to the surface). The angle of incidence is measured relative to normal, such that a zero degree angle of incidence would be perpendicular to the front windshield 40.

If, for example and without limitation, the front windshield 40 is formed from laminated glass, the critical angle between the glass and air may be between approximately 40-43 degrees from normal. Therefore, the light from the light source 72 is introduced at a lesser angle of incidence (i.e., nearer to normal) and is planned to move beyond the front windshield 40 for other purposes, unless light passage is obstructed or altered by contaminants on the front windshield 40. Contrarily, light from the light source 52 of FIG. 1 may be used solely for contaminant detection.

Figure 3A:
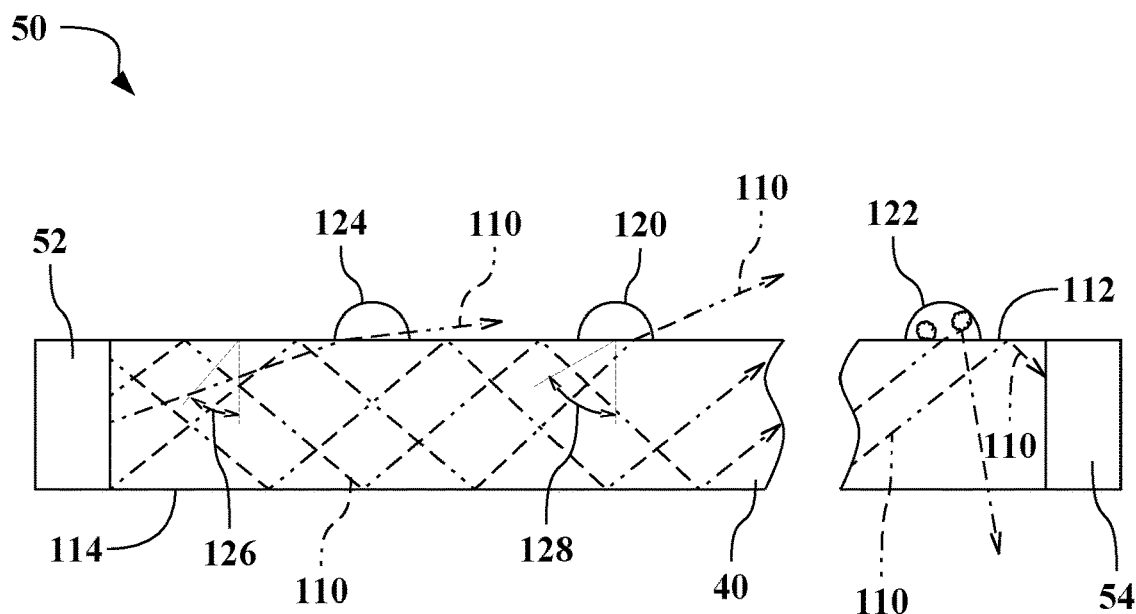
FIG. 3A is a schematic detail view of the window with the edge-lit contaminant detection system, illustrating the effects of contaminants on the window.
Figure 3B:
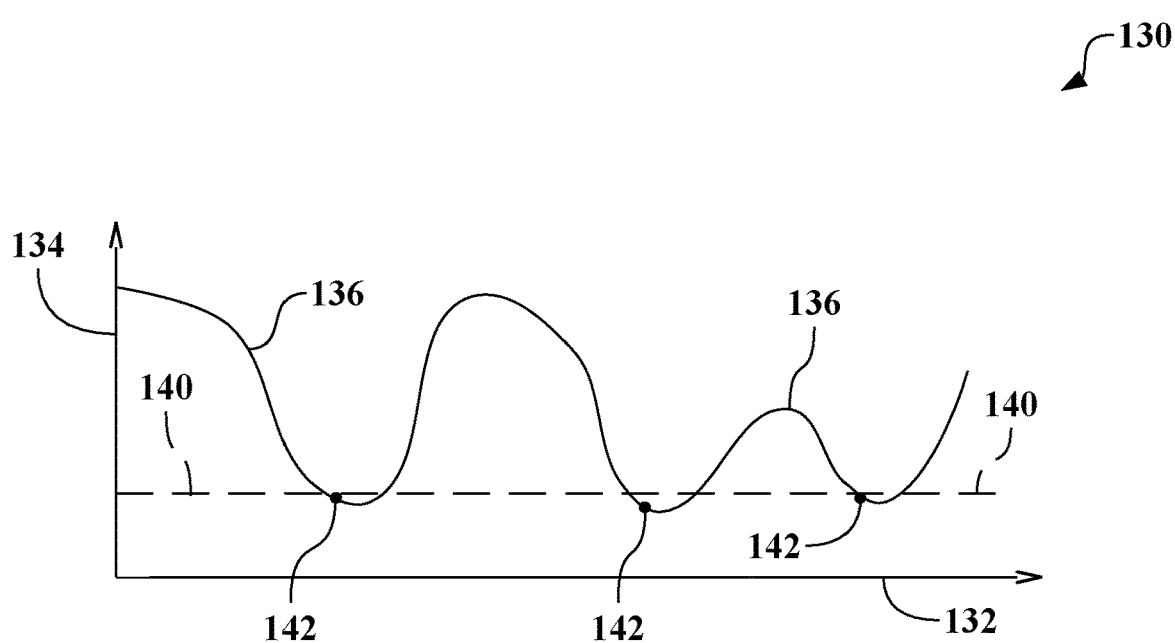
FIG. 3B is a schematic graph illustrating comparison of detected light to a threshold for the edge-lit contaminant detection system.

Referring also to FIGS. 3A and 3B, and with continued reference to FIGS. 1 and 2, there are shown additional detailed views illustrating operation of the contaminant detection system 50. FIG. 3A shows a detail view of light propagation within, and beyond, the front windshield 40 as affected by contaminants thereon. FIG. 3B shows a graphical view of processing of the signals received by the detectors 54, such as by the controller 60 or another control system.

FIG. 3A shows a schematic segment or portion of the front windshield 40 and the contaminant detection system 50. One of the light sources 52 is sending light rays 110 through the front windshield 40 between an exterior surface 112 and an interior surface 114. Any light rays 110 that pass to an edge of the front windshield 40 will be collected or measured by one of the detectors 54. The view of FIG. 3A may be an edge of the front windshield 40 or may be a plane-intersection view of the front windshield 40, such that no hatch marks are shown in order to better illustrate movement of light. Note that FIG. 3A, in addition to the other figures, may not be shown to scale.

FIG. 3A shows a plurality of illustrative contaminants on the exterior surface 112. The contaminants illustrated are, for example and without limitation, a water droplet 120, a dust particle or mud droplet 122, and an oil droplet 124. Each of the contaminants affects propagation of light through the front windshield 40 via total internal reflection. Furthermore, each of the contaminants may have different effects on light propagation.

As schematically illustrated in FIG. 3A, some of the light rays 110 pass via total internal reflection from the light source 52 to the detector 54. However, some of the light rays 110 come into contact with contaminants on the exterior surface 112, and, because the contaminants have a different refractive index than air, change the ability of the light to continue passing through the front windshield 40 via total internal reflection.

The refractive index of air is slightly over 1 (approximately 1.000293,) but the refractive index of the contaminants is higher (water or ice is approximately 1.30-1.35 and oil may be between 1.4-1.5). Therefore, the critical angle for total internal reflection will be lower at the intersection of the exterior surface 112 and any of the water droplet 120, the mud droplet 122, or the oil droplet 124, such that light rays 110 are less likely to continue via total internal reflection when incident on the contaminants.

The critical angle ($\theta c$) for total internal reflection may be determined by the relationship between the refractive index of the glass ($n_1$) and of the air or contaminant ($n_2$) on the exterior surface 112 of the front windshield 40. The formula for critical angle is: $(\theta c)=\arcsin(n_2/n_1)$. Therefore, while the critical angle between the glass ($n_1=1.5$) of the front windshield 40 and the surrounding air ($n_2=1.0$) may be approximately 42 degrees, and is represented by a critical angle 126 in FIG. 3A. Any light ray 110 incident upon the exterior surface 112 at less than the critical angle 126—i.e., closer to normal to the exterior surface 112—will pass out of the front windshield 40, and any light ray 110 incident upon the exterior surface at greater than the critical angle 126 will be totally internally reflected within the front windshield 40.

The critical angle between the glass ($n_1=1.5$) and the water droplet 120 ($n_2=1.3$) may be approximately 60 degrees, and is represented by a critical angle 128 in FIG.

3A. This means that a light ray 110 having an incident angle of about 50 degrees will be totally reflected when incident upon the portions of the exterior surface 112 with only air thereupon but will escape the front windshield 40 when incident upon the water droplet 120 at the exterior surface 112.

As shown in FIG. 3A, one of the light rays 110 is incident upon the water droplet 120, and escapes the front windshield 40, such that it will not reach the detector 54. Note that a similar result would occur if water vapor (fog) collects on the interior surface 114. Generally, any contaminant on the exterior surface—or the interior surface 114—will result in less total internal reflection of the light rays 110 introduced at the edge of the front windshield 40, such that contaminants will result in less light passing from the light source 52 to the detector 54.

Depending on the dust or dirt content of the mud droplet 122, light rays 110 incident thereupon may be pulled from the front windshield 40, but may also be reflected by dust particles back toward the interior surface 114. When reflected back into the windshield 40 by the mud droplet 122, the light rays 110 will often have a high angle of incidence on the interior surface 114, such that the mud droplet 122 is also likely to reduce the amount of light passing from the light source 52 to the detector 54. The critical angle between the glass ($n_1$=1.50) and the oil droplet 124 ($n_2$=1.47) may be approximately 78 degrees, such that many light rays 110 will be pulled from the front windshield 40 when incident upon the oil droplet 124.

Note that although the contaminants are illustrated on the exterior surface 112 of the front windshield 40, the contaminant detection system 50 may be monitoring other windows and other surfaces. For example, and without limitation, the contaminant detection system 50 may be monitoring for contaminants, such as dirt or moisture, on the interior surface 114 of the front windshield 40. Additionally, the contaminant detection system 50 may be monitoring for contaminants on the rear window 42, any of the side windows 44, or any other optical surface.

The light source 52 used to illuminate the front windshield 40, via the edges, may be of suitable power, wavelength, and/or spectrum to not be visible to the humane eye and to not strongly overlap with solar illumination. If the light source 52 is similar to solar illumination, there may be a significant effect on the detectors 54 during the day. For example, and without limitation, a laser or LED light source 52 centered in the wavelength region of 800 to 940 nanometers. Light sources 52 configured as such may have optical powers ranging from 10 milliwatts up to 500 watts.

Alternatively, the light source 52 may be configured with a relatively short wavelength, in the range of approximately 450 nanometers, would have a greater sensitivity to scatter and would be more easily decoupled from the wave guide effect of the front windshield 40 than longer wavelengths. Furthermore, the low optical power generated by low wavelength light sources 52 would have little possibility of being noticeable to humans nearby or in the vehicle 10.

Skilled artisans will recognize various types of components that may be used for the detectors 54. For example, and without limitation, the detectors 54 may be a PIN diode or an avalanche photodiode (APD) with a differential analog to digital amplifier.

FIG. 3B shows a graph 130 illustrating the signals of light rays 110 projected by light source 52 and received by the detectors 74, such as illustrated in FIG. 3A, by the contaminant detection system 50 (or the contaminant detection system 70, depending on configuration). An x-axis 132 shows progression of time and a y-axis 134 shows the measured light by the detectors 74. A signal 136 represents an output of the detectors 74, as processed, and possibly recorded, by the controller 60.

As shown in FIG. 3B, a threshold 140 illustrates an estimated contaminant, amount, layer, or density, beyond which the view through the front windshield 40 may be obstructed. Skilled artisans will recognize that the threshold 140 may be set based on operating conditions of the specific vehicle 10 into which the contaminant detection system 50 is incorporated.

A plurality of signal points or trigger points 142 are illustrated in the graph 130. As shown in FIG. 3B, the trigger points 142 occur at, or just after, the signal 136 of light measured by the detectors 74 crosses or drops below the threshold 140. When the signal 136 drops below the threshold 140, the contaminants on the exterior surface 112 or the interior surface 114 of the front windshield 40 are causing light to escape from total internal reflection.

At the trigger points 142, the controller 60 executes a response action or cleaning operation. The response action may include, for example and without limitation: wiping the exterior surface 112 with the wiper blade 56; depositing wiper fluid on the exterior surface 112; signaling a maintenance light or sending a maintenance notification; triggering a defogger for the interior surface 114; applying detergent to the exterior surface 112; and combinations thereof.

Note that the signal 136 may not immediately increase, as it may take some time for the remediation from the response action to remove the contaminants. In some configurations, if the signal 136 does not increase sufficiently, the controller 60 may command additional response actions. For example, and without limitation, the controller 60 may initially command wiping the front windshield 40 with the wiper blades 56. Then, if the signal 136 does not increase, which suggests that the contaminants have not been sufficiently remediated, the controller 60 may instruct depositing wiper fluid onto the front windshield 40.

The signal 136 may be an absolute signal or may be a differential signal. For example, the detector 54 may be detecting an initial light value and a current light value, and then determining a differential value between the initial light value and the current light value. The determined differential value from the controller 60 may then be compared to the threshold 140, such that the controller 60 is looking for short term changes in light at the detectors 54. Furthermore, the initial value may be reset, such that the differential value may be adjusted while the vehicle 10 is operating. Either the controller 60 or the detector 54, itself, may be responsible for determining and/or outputting the differential signal or value.

Differential value comparisons may be useful to overcome minor damage to the front windshield 40, such as chips or cracks, which may affect the ability of light to pass through the front windshield 40 via total internal reflection. Additionally, differing lighting conditions, such as varying light intensity from the sun or exterior artificial lights, may be overcome by the controller 60 comparing differential light values to the threshold 140.

In some configurations, the detector 54 may be (or include) a spectrophotometer, and the light source 52 may project wide spectrum light. For example, the light source 52 may be a white LED with a broad spectral band. The controller 60 may be configured to analyze the light measured with the spectrophotometer detector 54, and to determine the type of contaminant on the front windshield 40 based on the analyzed light. Different contaminants may pull different spectra of light from the front windshield 40. For example, as shown in FIG. 3A, the controller 60 and the spectrophotometer detector 54 may be configured to determine whether the contaminant is any of the any of the water droplet 120, the mud droplet 122, or the oil droplet 124.

Furthermore, the controller 60 may be configured such that it uses the determined contaminant to select which of the available response actions should be implemented to remediate the contaminants on the front windshield 40. For example, the controller may choose to operate the wiper blade 56 if the contaminant is water, to apply the wiper fluid if the contaminant is dirt, or to apply a detergent if the contaminant is oil.

Skilled artisans will recognize the difference between detergents and wiper fluid, which may include alcohol, such as methanol or ethylene glycol, and deicers, but generally does not contain soap. The detergent may include soap, in order to better clean the oil droplets 124, and may be used in conjunction with operation of the wiper blades 56, and may then be followed by wiper fluid on the exterior surface 112. Either wiper fluid or detergent may be referred to as cleaning fluid.

Figure 4A:
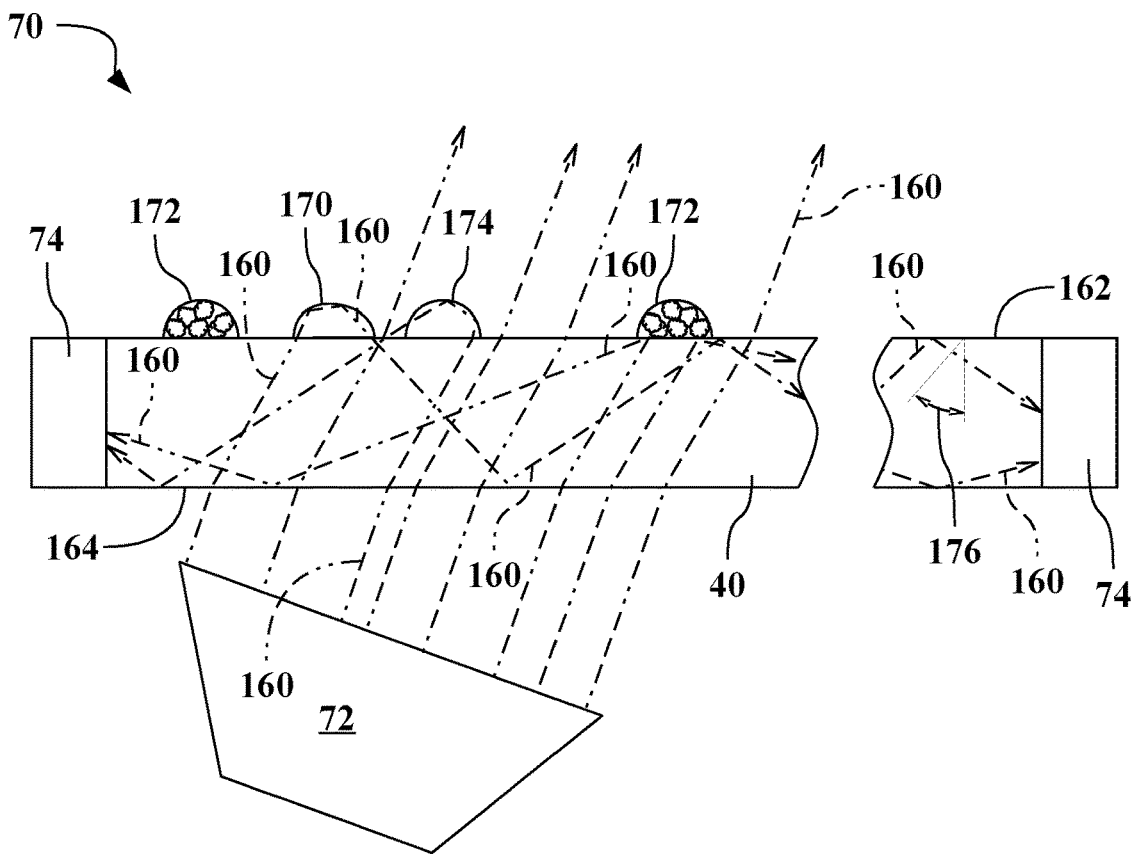
FIG. 4A is a schematic detail view of the window with the face-lit contaminant detection system, illustrating the effects of contaminants on the window.
Figure 4B:
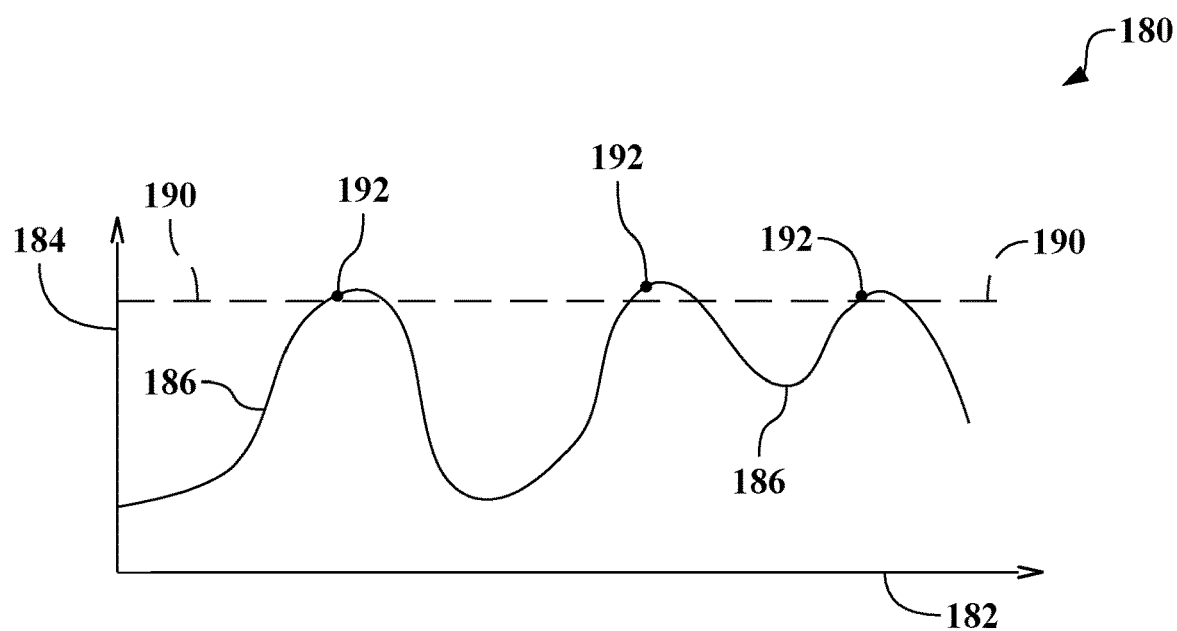
FIG. 4B is a schematic graph illustrating comparison of detected light to a threshold for the face-lit contaminant detection system.

Referring also to FIGS. 4A and 4B, and with continued reference to FIGS. 1-3B, there are shown additional detailed views illustrating operation of the contaminant detection system 70. FIG. 4A shows a detail view of light propagation relative to the front windshield 40 as affected by contaminants thereon. FIG. 4B shows a graphical view of processing of the signals received by the detectors 74, such as by the controller 60 or another control system.

FIG. 4A shows a schematic segment or portion of the front windshield 40 and the contaminant detection system 70. The light source 72 is attempting to send light rays 160 through the front windshield 40. As discussed above relative to FIG. 2, the light source 72 may be, for example and without limitation, part of a LIDAR or RADAR system.

In the edge-lit contaminant detection system 50 of FIG. 3A, the light sources 52 are attempting to send as much light as possible to the detectors 54. Therefore, the contaminants act to limit the wave guide capabilities of the window in the edge-lit contaminant detection system 50 of FIGS. 1 and 3A. However, in the face-lit contaminant detection system 70 of FIG. 4A, the light source 72 is attempting to send the light rays 160 through the front windshield 40, without being measured by the detectors 74, such that light from the light source 72 may be used for other purposes.

However, contaminants may restrict the ability of the light rays 160 to pass completely through the front windshield 40, and some of the light rays 160 may be redirected, reflected, or bounced to the edges of the front windshield 40 to be collected or measured by one of the detectors 74. Therefore, the contaminants act to trigger the wave guide capabilities of the window in the face-lit contaminant detection system 70 of FIGS. 2 and 4A. The view of FIG. 4A may be an edge of the front windshield 40 or may be a plane-intersection view of the front windshield 40, such that no hatch marks are shown in order to better illustrate movement of light. Note that FIG. 4A, in addition to the other figures, may not be shown to scale.

FIG. 4A shows a plurality of illustrative contaminants on the exterior surface 162. The contaminants illustrated are, for example and without limitation, a water droplet 170, a dust particle or mud droplet 172, and an oil droplet 174. Each of the contaminants may have different effects on light propagation through, or into, the front windshield 40.

The critical angle between the glass ($n_1=1.5$) of the front windshield 40 and the surrounding air ($n_2=1.0$) may be approximately 42 degrees, as illustrated by a critical angle 176. However, the light source 72 is configured with an incident angle that is less than the critical angle—in FIG. 4A the incident angle is approximately 20 degrees—such that the light rays 160 will largely pass through the front windshield 40, unless the light rays 160 are obstructed by contaminants.

Therefore, as schematically illustrated in FIG. 4A, many of the light rays 160 from the light source 72 pass through the front windshield 40 and are not measured by the detector 74. However, some of the light rays 160 come into contact with contaminants on the exterior surface 162 and may be redirected by the contaminants. A portion of the redirected light will be incident on the interior surface 114 or the exterior surface 112 at angles exceeding the critical angle, such that the light will proceed to the edges and the detectors 74.

As shown in FIG. 4A, one of the light rays 160 is incident upon the water droplet 170 at an internal angle that is less than the critical angle between the surface of the water droplet 170 and the surrounding air. Therefore, that light ray 160 is subject to total internal reflection within the water droplet 170 and is redirected back into the front windshield 40, as opposed to passing beyond the front windshield 40. If, as shown, that light ray 160 reenters the front windshield 40 at an angle sufficient for total internal reflection, the light ray 160 will pass to an edge of the front windshield 40 and the detectors 74 will measure additional light due to water droplets 170.

Generally, a contaminant on the exterior surface—or the interior surface 164—will result in alteration of the light rays 160, such that contaminants may result in more light from the light source 72 being deflected to the detectors 74. The geometry of the specific contaminant may determine how much light is captured by the front windshield 40 and delivered to the detectors 74.

The dust or dirt particles of the mud droplet 172 may be particularly likely to redirect the light rays 160 back into the front windshield 40. When reflected back into the windshield 40 by the mud droplet 172, the light rays 160 may have a high angle of incidence (relative to normal) at the interior surface 164, such that the mud droplet 172 is likely to increase the amount of light captured by the front windshield 40 and passed to the detectors 74.

Note that although the contaminants are illustrated on the exterior surface 162 of the front windshield 40, the contaminant detection system 70 may be monitoring other windows and other surfaces. For example, and without limitation, the contaminant detection system 70 may be monitoring for contaminants, such as dirt or moisture, on the interior surface 164 of the front windshield 40.

Additionally, the contaminant detection system 70 may be monitoring for contaminants on the rear window 42 or any of the side windows 44. In many configurations, additional light sources 72 may be located adjacent either the rear window 42 or the side windows 44. These windows may not include wiper blades and/or fluid dispensing systems. Therefore, remediation of contaminant build up may need to occur via maintenance—such as cleaning the vehicle 10 or the rear window 42 and the side windows 44.

FIG. 4B shows a graph 180 illustrating the signals of light rays 160 projected by light source 72 and received by the detectors 74, such as illustrated in FIG. 4A, by the contaminant detection system 70. An x-axis 182 shows progression of time and a y-axis 184 shows the measured light by the detectors 74. A signal 186 represents an output of the detectors 74, as processed, and possibly recorded, by the controller 60.

As shown in FIG. 4B, a threshold 190 illustrates an estimated contaminant, amount, layer, or density, beyond which the view through the front windshield 40 may be obstructed. Skilled artisans will recognize that the threshold 190 may be set based on operating conditions of the specific vehicle 10 into which the contaminant detection system 70 is incorporated.

A plurality of signal points or trigger points 192 are illustrated in the graph 180. As shown in FIG. 4B, the trigger points 192 occur at, or just after, the signal 186 of light measured by the detectors 74 crosses or raises above the threshold 190. When the signal 186 is greater than the threshold 190, the contaminants on the exterior surface 162 or the interior surface 164 of the front windshield 40 are causing light to be directed back into total internal reflection and being measured by the detectors 74.

At the trigger points 192, the controller 60 executes a response action. The response action may include, for example and without limitation: wiping the exterior surface 162 with the wiper blade 56; depositing wiper fluid on the exterior surface 162; signaling a maintenance light or sending a maintenance notification; triggering a defogger for the interior surface 164; applying detergent to the exterior surface 162; and combinations thereof.

The signal 186 may be an absolute signal or may be a differential signal. For example, the detector 74 may be detecting an initial light value and a current light value, and then determining a differential value between the initial light value and the current light value. The determined differential value from the controller 60 may then be compared to the threshold 190, such that the controller 60 is looking for short term changes in light at the detectors 74. Furthermore, the initial value may be reset, such that the differential value may be adjusted while the vehicle 10 is operating.

Differential value comparisons may be useful to overcome minor damage to the front windshield 40, such as chips or cracks, which may affect the ability of light to pass through the front windshield 40 via total internal reflection. Note that chips and cracks proximate the light source 72 may greatly affect passage of light through the windshield 40, such that differential signals may be useful in overcoming such conditions. Additionally, differing lighting conditions, such as varying light intensity from the sun or exterior artificial lights, may be overcome by the controller 60 comparing differential light values to the threshold 190.

In some configurations, the detector 74 may be (or include) a spectrophotometer, and the light source 72 may project wide spectrum light. The controller 60 may be configured to analyze the light measured with the spectrophotometer detector 74, and to determine the type of contaminant on the front windshield 40 based on the analyzed light.

Different contaminants may reflect and absorb different spectra of light from the front windshield 40. For example, the oil droplet 174 may absorb and reflect different spectra than the water droplet 170. Therefore, the reflected light that ends up in total internal reflection and is measured by the spectrophotometer detector 74 may be used to identify the type of contaminant. For example, as shown in FIG. 4A, the controller 60 and the spectrophotometer detector 74 may be configured to determine whether the contaminant is any of the any of the water droplet 170, the mud droplet 172, or the oil droplet 174.

Furthermore, the controller 60 may be configured such that it uses the determined contaminant to select which of the available response actions should be implemented to remediate the contaminants on the front windshield 40. For example, the controller may choose to operate the wiper blade 56 if the contaminant is water, to apply the wiper fluid if the contaminant is dirt, or to apply a detergent if the contaminant is oil.

Note that in some situations of the vehicle 10, both the edge-lit contaminant detection system 50 and the face-lit contaminant detection system 70 could be used together. They may be used on different windows, such as the face-lit contaminant detection system 70 being used on the front windshield 40 and the edge-lit contaminant detection system 50 being used on the rear window 42. Alternatively, they may be used on the same windows, with the face-lit contaminant detection system 70 projecting a specific light spectrum through the front windshield 40 and the edge-lit contaminant detection system 50 projecting a different light spectrum into the front windshield 40. The same detectors (either detectors 54 or detectors 74) could be used and the controller 60 could sort or differentiate between the different spectra, or different sets of detectors could be used to measure only specific spectral ranges.

In some configurations, the vehicle 10 may be an autonomous vehicle, which is likely to use LIDAR and/or RADAR with the light source 72 on one or more of the different windows. For autonomous vehicles, remediation of, for example, contaminants on the side windows 44 may be difficult, as there is no dedicated operator of the vehicle 10. Therefore, the response action triggered by the controller 60, which may also be part of the autonomous control system, may be a maintenance signal that instructs the vehicle 10 to return to a home base or maintenance station for cleaning of the side windows 44.

In most configurations of the either the edge-lit contaminant detection system 50 or the face-lit contaminant detection system 70, the windows to which the system is applied will not need to be modified from the types normally used for the vehicle 10. Skilled artisans will recognize that adjustment of the spectrum projected by the light sources 52 and the light sources 72 and/or adjustment of the spectrum measured by the detectors 54 and the detectors 74 will allow implementation of the edge-lit contaminant detection system 50 and the face-lit contaminant detection system 70 to legacy windows.

The detailed description and the drawings or figures are supportive and descriptive of the disclosure, but skilled artisans will recognize additional scope, as may be included in the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for detecting a contaminant on an optical surface, comprising:
   introducing light from a light source into the optical surface, wherein the light source is positioned at the edge of the optical surface;
   measuring light at an edge of the optical surface with a detector, wherein the detector is a spectrophotometer;
   comparing the measured light to a threshold, wherein measuring light at the edge of the optical surface with the detector includes:
      detecting an initial light value and a current light value;
      determining a differential value between the initial light value and the current light value, and wherein the determined differential value is compared to the threshold; and
      if the measured light crosses below the threshold, implementing a response action, and the response action includes one of:
      cleaning the optical surface with a wiper blade; or
      depositing a cleaning fluid on the optical surface;
   analyzing the light measured with the spectrophotometer; and
   determining a type of the contaminant on the optical surface based on the analyzed light to be at least one of water, dirt, and oil.

2. The method of claim 1, wherein the determining the type of contaminant results in:
   operating the wiper blade if the contaminant includes water;
   applying a wiper fluid if the contaminant includes dirt; and
   applying a detergent if the contaminant includes oil.

3. The method of claim 1,
   wherein a second light source projects a non-visible wavelength, and
   wherein the second light source is positioned at an angle of incidence relative to the optical surface that is less than a critical angle between the optical surface and air.

4. The method of claim 3, wherein implementing the response action occurs when the measured light from the second light source crosses above the threshold.

5. The method of claim 4,
   wherein measuring light from the second light source at the edge of the optical surface with the detector includes:
      detecting an initial light value and a current light value;
      determining a differential value between the initial light value and the current light value; and
   wherein the determined differential value is compared to the threshold.

6. The method of claim 2, wherein the response action further includes triggering a defogger for the optical surface.

7. The method of claim 1, wherein the optical surface is part of an autonomous vehicle, and the response action is a maintenance signal.

* * * * *